United States Patent
Sederquist et al.

(10) Patent No.: US 8,304,123 B2
(45) Date of Patent: Nov. 6, 2012

(54) AMBIENT PRESSURE FUEL CELL SYSTEM EMPLOYING PARTIAL AIR HUMIDIFICATION

(75) Inventors: Richard A. Sederquist, Middletown, CT (US); Brian W. Wells, Vancouver (CA); Alexander Mossman, Vancouver (CA); Craig R. Louie, West Vancouver (CA)

(73) Assignees: Daimler AG, Stuttgart (DE); Ford Motor Company, Dearborn, MI (US)

(*) Notice: Subject to any disclaimer, the term of this patent is extended or adjusted under 35 U.S.C. 154(b) by 621 days.

(21) Appl. No.: 12/110,767

(22) Filed: Apr. 28, 2008

(65) Prior Publication Data
US 2008/0199743 A1 Aug. 21, 2008

Related U.S. Application Data

(63) Continuation of application No. 10/792,403, filed on Mar. 3, 2004, now abandoned.

(60) Provisional application No. 60/451,943, filed on Mar. 3, 2003.

(51) Int. Cl.
*H01M 8/06* (2006.01)
(52) U.S. Cl. ........ 429/413; 429/414; 429/450; 429/437; 429/456; 429/492
(58) Field of Classification Search .................. 429/413, 429/414, 456, 479, 480, 534, 437, 438, 434, 429/450, 483, 492
See application file for complete search history.

(56) References Cited

U.S. PATENT DOCUMENTS

| | | | |
|---|---|---|---|
| 5,260,143 A | 11/1993 | Voss et al. | |
| 5,441,819 A | 8/1995 | Voss et al. | |
| 5,503,944 A | 4/1996 | Meyer et al. | |
| 5,879,826 A | 3/1999 | Lehman et al. | |
| 6,007,931 A | 12/1999 | Fuller et al. | |
| 6,068,941 A | 5/2000 | Fuller et al. | |
| 6,117,577 A * | 9/2000 | Wilson | 429/409 |
| 6,232,006 B1 | 5/2001 | Breault | |
| 6,274,259 B1 | 8/2001 | Grasso et al. | |

(Continued)

FOREIGN PATENT DOCUMENTS
CA 2342825 3/2000
(Continued)

OTHER PUBLICATIONS

Wheeler, D. et al., "Advancements in Fuel Cell Stack Technology at International Fuel Cells," *J. of New Materials for Material for Electrochemical Systems* 4:233-238, 2001.

*Primary Examiner* — Raymond Alejandro
(74) *Attorney, Agent, or Firm* — Patent Central LLC; Stephan A. Pendorf

(57) ABSTRACT

A fuel cell system is provided that is capable of operating at high temperatures and near-ambient pressure with partial humidification of air supplied to the fuel cell stack. The fuel cells of the stack incorporate gas diffusion barrier layers at the cathode side thereof. The system includes a cooling loop for circulating a liquid coolant through the stack. In some embodiments, an incoming air stream is partially humidified with water vapor transferred from a cathode exhaust stream in a gas-exchange humidifier or enthalpy wheel. In other embodiments, a cathode recycle is employed to partially humidify the incoming air. The humidity of the air and cathode exhaust streams is maintained below a stack saturation point. Methods of operating the fuel cell system are also provided.

18 Claims, 2 Drawing Sheets

U.S. PATENT DOCUMENTS

Figure 1:
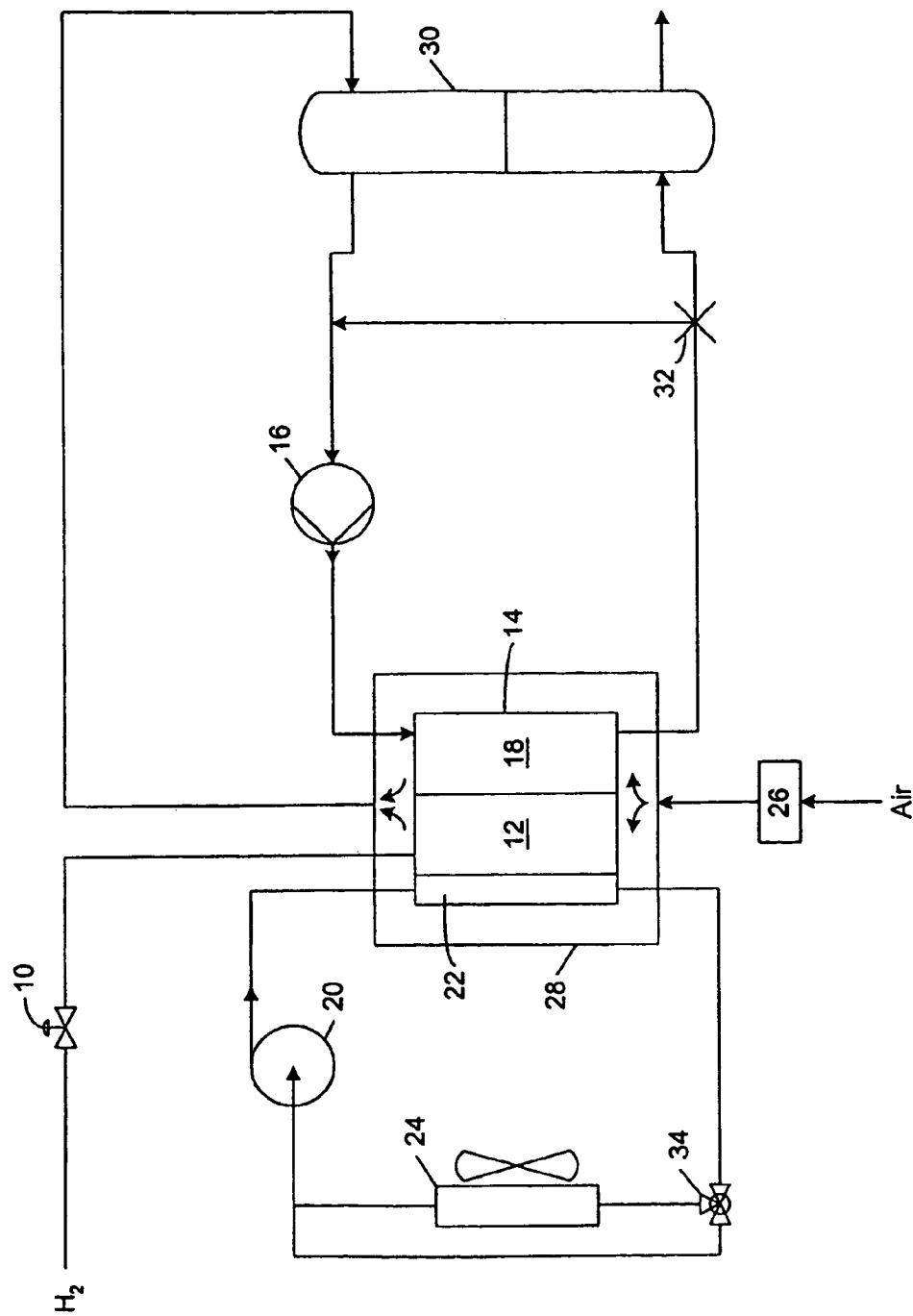

| | | |
|---|---|---|
| 6,416,891 B1 | 7/2002 | Condit et al. |
| 6,416,895 B1 | 7/2002 | Voss et al. |
| 6,451,470 B1 | 9/2002 | Koschany et al. |
| 6,521,369 B1 | 2/2003 | Mercuri et al. |
| 6,605,381 B1 | 8/2003 | Rosenmayer |
| 6,669,177 B2 * | 12/2003 | Shimanuki et al. ............. 261/96 |
| 2001/0046616 A1 | 11/2001 | Mossman |
| 2002/0068214 A1 | 6/2002 | Reiser |

FOREIGN PATENT DOCUMENTS

| | | |
|---|---|---|
| CN | 1367941 (A) | 9/2002 |
| JP | 2002260697 A | 9/2002 |
| JP | 2002292233 A | 10/2002 |
| WO | WO 00/63982 | 10/2000 |

* cited by examiner

AMBIENT PRESSURE FUEL CELL SYSTEM EMPLOYING PARTIAL AIR HUMIDIFICATION

CROSS-REFERENCE TO RELATED APPLICATION

This application is a continuation of U.S. patent application Ser. No. 10/792,403 filed Mar. 3, 2004, abandoned, which claims the benefit of U.S. Provisional Patent Application No. 60/451,943 filed Mar. 3, 2003, where this provisional application is incorporated herein by reference in its entirety.

BACKGROUND OF THE INVENTION

1. Field of the Invention

The present invention relates to fuel cell systems operating at or near ambient pressure. In particular, the present invention relates to fuel cell systems operating at or near ambient pressure with partial air humidification, and methods of operating such systems.

2. Description of the Related Art

Fuel cells are known in the art. Fuel cells electrochemically react a fuel stream comprising hydrogen and an oxidant stream comprising oxygen to generate an electric current. Fuel cell electric power plants have been employed in transportation, portable and stationary applications.

Water management issues are critical in polymer electrolyte membrane (PEM) fuel cell operation. Humidification of the membrane is required to maintain optimal performance. As the water content of the membrane falls it loses the ability to transport protons, its electrical resistance increases, and fuel cell performance decreases and membrane failure may occur. To ensure adequate humidification of the membrane the reactant streams supplied to the fuel cell stack are typically humidified. At the same time, water present at the cathode—both product water produced at the cathode and water transported across the membrane from the anode as a result of electroosmotic drag—must be removed, otherwise flooding of the cathode flow field can occur.

Various approaches have been used to humidify the reactant streams supplied to fuel cells. For example, reactants can be humidified by flowing the reactant stream and liquid water on opposite sides of a water permeable membrane. Product water from the fuel cell can be condensed from the reactant exhaust streams and then used for humidification. Water vapor or atomized water droplets may be injected into the reactant streams, as well. The oxidant stream may also be heated and humidified by flowing it and the oxidant exhaust stream on opposite sides of a water permeable membrane in a combined heat and humidity exchange apparatus. Examples of the latter apparatus are described in U.S. Pat. No. 6,007,931 and commonly assigned U.S. Pat. No. 6,416,895 B1.

Of course, water management issues need to be considered in the context of other system requirements. In many applications, such as automotive systems, for instance, high power density (power output capability per unit volume) operation is desirable, as is the ability to operate partial loads. Under such dynamic load conditions, maintaining a proper water balance in the fuel cells can be particularly challenging.

One approach to achieve these ends is to operate the fuel cell stack at higher pressure. The higher partial pressure of reactants in the fuel cells supports higher power density operation and higher operating temperatures. Higher pressure drops across the reactant flow fields also enables mechanical removal of liquid water from the fuel cells. However, this approach requires expensive air pressurization and hydrogen recycle equipment that increase the cost, complexity and size of the power plant and also represent a significant parasitic power loss. Humidification systems for the reactants similarly increase the cost, complexity and size of the power plant. The cost of stack components capable of operating at high pressures, such as seals, for example, may also be increased. Furthermore, liquid water management issues can cause unstable cell operation under dynamic load conditions.

An alternative approach employs wicking or similar passive means to provide water to the membrane. PEM fuel cell power plants developed by UTC Fuel Cells, LLC, for example, employ this approach. Porous water transport plates adjacent porous anode and/or cathode support layers facilitate water transport to the anode and/or cathode surfaces. These power plants can be operated at near-ambient pressures, which can reduce the cost and power loss associated with an air compressor.

This approach has some disadvantages as well. For example, the water transport plates and coolant loops tend to be complex. Operation and control systems are also complicated: product water enters the coolant loop and must be removed; pressure differentials are created between the reactant flow fields and coolant water circulation passages to assist water transport through the porous support layers and cells; and/or, dual coolant loops may be employed to ensure water balance at higher ambient temperatures. These power plants also require complex systems for cold start capability, such as, for introducing methanol or ethanol into coolant passages on shutdown to prevent water trapped therein from freezing, or introducing a non-volatile organic antifreeze solution into the water transport plates. Further, operation using zero relative humidity reactant streams with a PEM fuel cell having a porous water transport plate eventually causes a drying out of the PEM electrolyte; US 2002/0068214 A1 discloses that the loss of water from the electrolyte may be restricted by incorporating anode and/or cathode electrolyte dry-out barriers. Such efforts at maintaining efficient water balance involve additional cost, weight, volume burdens, fuel cell performance penalties, and often require complex control apparatus.

U.S. Pat. No. 6,451,470 B1 and CA 2,342,825 A1 disclose gas diffusion layers having a gas permeability gradient perpendicular to the membrane that inhibits the diffusion of water from the membrane (a "gas diffusion barrier", or GDB). This permits fuel cell operation without external humidification of the reactants. The GDB structure also allows air-cooling of the fuel cell by supplying air to the cathode flow fields at relatively high stoichiometries. The '825 application, for example, discloses adopting air ratios, i.e., stoichiometries, of 8-70.

However, ambient pressure fuel cell systems using such passive water management systems do not appear suitable for high power density applications and/or operating at higher temperatures. For example, the '470 patent discloses that the maximum operating temperature of fuel cells employing a GDB is about 75° C. if air is supplied at ambient pressure. According to the '470 patent, at higher temperatures, a GDB having a sufficiently low effective diffusion coefficient for water would no longer ensure sufficient diffusion for reactant gases, in particular oxygen; although increasing air pressure permits increased operating temperatures (col. 3, lines 29-42). Indeed, the system disclosed in the '470 patent demonstrated a drastic drop in performance above a power density of 503 $mA/cm^2$ at near-ambient air pressure (col. 7, lines 50-60). Published results of stacks employing UTC Fuel Cell porous bipolar plates disclose optimized performance at 65° C. (see, D. J. Wheeler et al., *J. New Mat. Electrochem. Systems* 4, 233-238 (2001)).

It is desirable to have a fuel cell electric power plant that can maintain adequate water balance in the fuel cells at higher current densities and temperatures, without requiring liquid water removal or a pressurized air supply. The present invention addresses the disadvantages of conventional fuel cell power plants and provides further related advantages.

BRIEF SUMMARY OF THE INVENTION

A fuel cell system and methods of its operation are provided. Fuel cell power plants and vehicles incorporating the present fuel cell system are also provided.

In some embodiments, the present fuel cell system comprises: a fuel cell stack; a fuel system for supplying fuel to the stack; a blower for supplying air to the stack at near-ambient pressure; a humidification device in fluid communication with an air stream supplied to the stack and a cathode exhaust stream exiting the stack for transferring water vapor from the cathode exhaust stream to the air stream; and a coolant loop for circulating a liquid coolant through the stack. The fuel cells in the stack incorporate a cathode gas diffusion barrier layer.

In other embodiments, the present fuel cell system comprises: a fuel cell stack with fuel cells having a cathode gas diffusion barrier means; a fuel system for supplying a fuel to the stack; supply means for supplying air to the stack at near-ambient pressure; humidification means for transferring water vapor from the cathode exhaust stream with the air supplied to the stack; and, a coolant loop for circulating a liquid coolant through the stack.

The present fuel cell system may be part of a power plant for use in vehicles; as part of a cogeneration system for stationary applications; or as part of a generator for portable power, back-up power or UPS applications.

In some embodiments, the present method comprises: supplying a stoichiometric excess of air to the stack at near-ambient pressure; supplying a cathode exhaust stream to a humidification device; maintaining the relative humidity of the air stream below a stack inlet saturation point; maintaining the relative humidity of the cathode exhaust stream below a stack inlet saturation point; and, operating the stack at a temperature greater than about 75° C.

BRIEF DESCRIPTION OF THE DRAWING(S)

Figure 2:
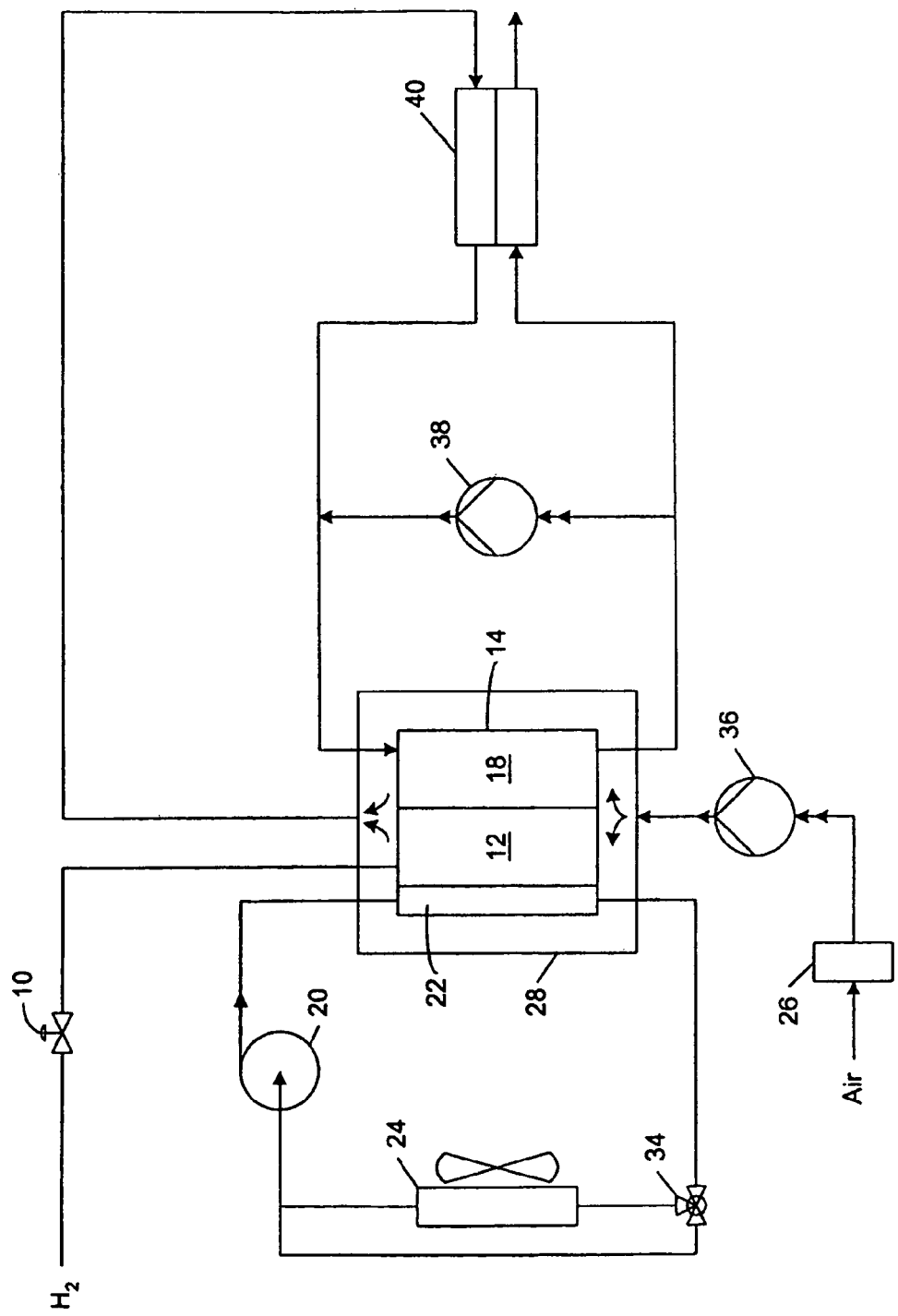

FIGS. 1 and 2 are schematic representations of embodiments of the present fuel cell system.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to." The term "blower" refers to blowers, fans and similar means for supplying a gas stream to a fuel cell stack at or near ambient pressure.

The present fuel cell system can maintain adequate water balance in the fuel cells of a fuel cell stack operating at high current densities and temperatures, without requiring liquid water removal or a pressurized air supply. The present fuel cell system may be incorporated into a fuel cell power plant. In turn, the fuel cell power plant may be used in various applications, such as an engine for a fuel cell-powered vehicle.

FIG. 1 is a schematic representation of an embodiment of the present fuel cell system. During normal operation hydrogen is supplied via valve 10 to the anodes 12 of the PEM fuel cells in stack 14 and air is supplied via variable-speed blower 16 to the cathodes 18. The hydrogen and oxygen in the air are electrochemically reacted to generate electrical power. Liquid coolant is circulated via pump 20 through the stack coolant circuit 22 and radiator 24, maintaining stack 14 within a suitable operating temperature range.

The cathodes of stack 14 incorporate a gas diffusion barrier (GDB) to assist in maintaining adequate humidification of the fuel cell membrane. A GDB is a gas diffusion layer that comprises a region spaced apart from the membrane that has a lower water vapor permeability than a region adjacent to the membrane, and which inhibits the diffusion of water vapor away from the membrane. Suitable materials for use as GDB include expanded graphite sheet materials having transverse fluid channels that have larger openings on the surface in contact with the membrane than the openings in contact with the fuel cell plate, such as described in U.S. Pat. No. 6,521, 369 B1. Alternatively, porous electrode material that is (partially) filled or coated with solid or liquid materials that decrease the permeability of water vapor, such as described in U.S. Pat. No. 6,451,470 B1 may be utilized. A laminate having a layer with at least one lower water vapor permeability ("barrier layer") and another layer having higher water vapor permeability adjacent to the membrane, such as described in CA 2,342,825 A1, may also be used. The barrier layer may comprise substantially impermeable materials with mechanical openings therein (like expanded graphite sheet, for example), filled or partially filled materials or microporous materials. The selection and design of the GDB is not essential to the present fuel cell system, and persons skilled in the art can readily select a suitable GDB for a given application. The GDB should be capable of maintaining adequate humidification of the fuel cell membranes at the selected temperature under partial power conditions.

Air is supplied to stack 14 at or near ambient pressure. For example, in some embodiments of the present system, the pressure drop associated with the stack air supply is about 0.3-0.5 psid (20-35 mbar). In such embodiments, the air stoichiometry may be about 1.2-3.0.

Inlet air is drawn through filter 26, which removes particulates and may also remove other contaminants, such as carbon dioxide and/or hydrocarbons, for example. The filtered air enters ventilation box 28 where it is partially preheated by stack 14. Allowing stack 14 to preheat the inlet air, which is rejected as higher temperature cathode exhaust, reduces the overall heat rejection requirements of the fuel cell system by this amount of sensible heating. In addition, any hydrogen leakage from stack 14 is collected in ventilation box 28, mixed with the inlet air and consumed in cathodes 18. However, the ventilation box is not essential to the present fuel cell system, and it is omitted in other embodiments.

The preheated air is directed to the "dry" side of gas-exchange humidifier 30, where it is further heated and partially humidified by the flow of cathode exhaust entering the "wet" side of humidifier 30. Damper 32 may be opened to allow at least a portion of the cathode exhaust to be recycled to stack 14, if desired. For example, cathode recycle could be used during partial power operation and/or to reduce the load on humidifier 30.

Suitable gas-exchange humidifiers may incorporate semi-permeable membranes, such as ion exchange or paper membranes, for example. An example of a suitable gas-exchange humidifier is disclosed in US 2001/0046616 A1, commonly assigned to the present applicants. The selection of gas-exchange humidifier, however, is not essential to the present fuel cell system, and persons skilled in the art can readily select a suitable humidifier for a given application.

While blower 16 may be located upstream of humidifier 30, if desired, having air drawn through the dry side results in a slightly higher pressure on the wet side. Any leak in the membrane would cause the cathode exhaust to mix with the air. This is equivalent to partial cathode recycle and is an acceptable failure mode for humidifier 30. This may allow for cost-savings in designing or selecting a humidifier due to less restrictive sealing requirements, for example.

FIG. 2 is a schematic representation of another embodiment of the present fuel cell system. The system of FIG. 2 employs air blower 36 and cathode recycle blower 38 for independent control of the air and cathode exhaust recycle flow rates. In addition, an enthalpy wheel 40 is employed to partially humidify the air stream supplied to stack 14. Enthalpy wheels are known in the art; the enthalpy wheel available from Emprise Corporation (Marietta, Ga.), incorporating a cordierite ceramic honeycomb material, for example, may be suitable. Of course, the particular enthalpy wheel is not essential to the present fuel cell system, and persons skilled in the art can readily select a suitable such device for a given application.

In some embodiments, at start-up, air and fuel may be supplied to the stack and the fuel cells operated at low load and low voltage to enhance internal heat generation. As cell temperatures increase, the load may be increased such that the partial pressure of water vapor produced in the fuel cells is below the saturation pressure to ensure that the air/cathode exhaust in the stack remains undersaturated. Alternatively, fuel and air may be catalytically combusted on the cathodes of the fuel cell in a controlled manner to heat the stack. A catalytic heater may be incorporated into the coolant loop, if desired; fuel and air may be combusted in the heater to heat the coolant circulating in the stack. Alternatively, or in addition, bypass valve 34 may be activated so that coolant bypasses radiator 24 during start up. In other embodiments, air is also supplied to the stack at high air stoichiometries (e.g., ~200) at start-up.

At higher power output, higher temperature operation (e.g., >75° C.) is desirable. As mentioned earlier, higher operating temperatures increase the heat rejection capacity of the cooling system. In automotive applications, for example, heat rejection is a limiting factor in the maximum power output for the stack, as radiator frontal area and performance are difficult to increase. Thus, increasing the heat rejection capacity of the cooling system enables fuel cell power plants with higher engine ratings for automotive applications. Higher temperature operation also provides higher cogeneration temperatures for stationary applications and better temperature derate characteristics for intermittent use applications.

The present fuel cell system employs an undersaturated air supply. That is, the relative humidity of the air supplied to the present fuel cell system is kept below the inlet cell saturation point, and the relative humidity of the cathode exhaust is kept below the outlet cell saturation point. In addition to enabling high temperature operation at near-ambient pressures, operating with an undersaturated air supply can also inhibit or substantially prevent liquid water from condensing and accumulating in the stack. This may provide several further advantages over similar fuel cell systems employing liquid water management. For example, liquid water management equipment, such as gas/water separators, drain traps, deionized or particulate water filters, or tanks for water fill or overflow, is not required. This may decrease the cost and complexity of the present fuel cell system. As another example, there may be a reduced coolant load through the coolant system. Product water present in the stack is substantially or completely in the vapor phase; hence, the heat of condensation of liquid product water does not have to be rejected through the coolant. Performance losses due to flooding of the fuel cells may also be reduced or eliminated. As a further example, freezability and cold start-up capability may be increased because freezing of liquid water in the stack is reduced or eliminated. Further, lower component corrosion and/or carrying of corrosion products in the stack by liquid water may result in longer stack lifetime and/or enable the use of lower-cost materials.

In some embodiments, the present fuel cell system may be operated at lower temperatures at lower power outputs and higher temperatures at higher power outputs. At lower power output, less or no external humidification of the air stream may be required because of the ability of the cathode GDB to inhibit water vapor diffusion away from the membrane, as described above. At the same time, higher air stoichiometries may be employed to assist in maintaining undersaturated conditions in the cathode flow field.

At higher temperatures, lower air stoichiometries may be employed. This may help reduce the loss of water from the stack associated with conventional fuel cell systems employing cathode GDB that employ unhumidified reactants. Unlike the conventional systems, which are air-cooled, the present fuel cell system does not require increased air stoichiometries with increased operating temperature to maintain the heat rejection capacity of the stack. Thus, by employing a liquid coolant, the air stoichiometry and coolant flow requirements are de-coupled in the present fuel cell system.

In alternate embodiments, the fan speed or output of the radiator in the present fuel cell system may be increased at high power output. The associated small increase in parasitic power loss may be offset in significantly enhanced cooling system performance and a reduced maximum fuel cell operating temperature.

In further embodiments, the speed of the blower in the air supply system is controlled to provide the desired amount of humidification to the air stream supplied to the stack at a given operating temperature. Controlling the speed of the blower allows for varying the dwell time of the incoming air in a gas-exchange humidifier or enthalpy wheel, for example. The longer the dwell time, the greater the heat and water vapor transfer rate from the cathode exhaust to the air stream. In other embodiments, the amount of cathode exhaust recycled into the incoming air stream is controlled with temperature to achieve the same result. In yet other embodiments, the speed of the blower is kept constant, and the amount of air supplied to the stack is controlled with temperature to provide the desired amount of humidification supplied to the stack. For example, controlled valves, dampers or diverters could be employed to vary the amount of air supplied to the stack from the blower. Combinations of the foregoing controls may also be used.

Hydrogen supply to stack 14 is dead-ended in the illustrated embodiments. If desired, anodes 12 may be purged of accumulated inert gases that may build up over time. For example, anode purge gas may be introduced into ventilation box 28, where it is diluted in the inlet air to below 4% and consumed at cathodes 18. Other means of disposing of the anode vent gas may be employed, if desired, including catalytically combusting it in a separate combustor or exhausting it to the environment. In alternative embodiments, a hydrogen recycle system is employed instead. The hydrogen supply need not be closed, though. For example, in further embodiments the fuel cell system includes a fuel processing system for reforming a fuel to produce hydrogen-rich reformate stream for the stack. The anode exhaust can be combusted to produce heat energy for upstream or downstream processing steps, if desired. Ultimately, the hydrogen source and configuration of the hydrogen supply system are not essential to the present fuel cell system; persons skilled in the art can readily design a suitable hydrogen supply system for a given application.

Likewise, the selection of liquid coolant is not essential to the present fuel cell system. Suitable coolants include deionized water, ethylene glycol and mixtures thereof. Other suitable liquid coolants will be readily apparent to persons skilled in the art. While a radiator is described in the illustrated embodiments, other heat exchange apparatus may be substituted in the present fuel cell system, provided adequate cooling of the fuel cell stack can be achieved.

While the illustrated embodiments employ a gas-exchange humidifier or enthalpy wheel, the present fuel cell system is not limited to these external air humidification devices. Other humidification devices that can recover water vapor from the cathode exhaust may also be employed. Similarly, while the illustrated embodiments employ a cathode recycle loop, the present fuel cell system does not require one.

In some applications, the cathode exhaust is preferred for humidifying the incoming air stream, as this reduces or eliminates the requirement for water storage systems in the present fuel cell system. However, in certain applications, such as larger stationary power plants, for example, the incremental increase in size and/or cost of such water storage systems is less of an issue. Accordingly, in some embodiments of the present fuel cell system, the air supply is may also be humidified by a separate water source, in addition to the cathode exhaust.

The applicants have determined that a fuel cell system employing cathode GDB in the stack cannot be operated at high temperatures with unhumidified air at high stoichiometries and near-ambient pressure without drying out the fuel cell membranes. In the present fuel cell system, partial humidification of the air stream enables high temperature operation at near-ambient pressures while maintaining fuel cell performance. At the same time, liquid water removal is minimized or eliminated, thereby reducing parasitic losses due to pressurized operation and flooding. The present fuel cell system also avoids problems associated with passive water management systems, as mentioned earlier.

All of the above U.S. patents, U.S. patent application publications, U.S. patent applications, foreign patents, foreign patent applications and non-patent publications referred to in the this specification and/or listed in the Application Data Sheet, are incorporated herein by reference in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fuel cell system comprising:
a fuel cell stack comprising a plurality of proton exchange membrane (PEM) fuel cells, each fuel cell having an anode side, a cathode side having an inlet and an outlet, a membrane disposed between the anode and cathode side, and a cathode gas diffusion barrier spaced apart from the membrane and having a lower water vapor permeability than a region adjacent to the membrane, which cathode gas diffusion barrier inhibits the diffusion away from the membrane of water generated in the cathode side as a result of fuel oxidation;
a fuel system for supplying a fuel to the anode side of the fuel cells of the stack;
a humidification device having a dry side having an inlet and an outlet and a wet side having an inlet and an outlet,
an air supply channel including a channel for supplying an air stream to the humidification device dry side inlet and a channel with a blower for supplying air at near ambient pressure from the humidification device dry side outlet to the inlets of the cathode sides of the fuel cells of the stack,
a cathode exhaust conduit connecting the PEM cathode side outlet with the humidification device wet side inlet for transferring water vapor from the cathode exhaust stream in the wet side of the humidification device to the air stream in the dry side of the humidification device; and
a coolant loop for circulating a liquid coolant through the stack.

2. The fuel cell system of claim 1 wherein the blower is a variable-speed blower.

3. The fuel cell system of claim 1 wherein the humidification device comprises a gas-exchange humidifier.

4. The fuel cell system of claim 1 wherein the blower is located downstream of the humidification device.

5. The fuel cell system of claim 1 wherein the fuel is substantially pure hydrogen.

6. The fuel cell system of claim 5 wherein the fuel supply system is dead-ended.

7. The fuel cell system of claim 5 wherein the fuel supply system comprises a hydrogen recycle loop.

8. The fuel cell system of claim 1 wherein the coolant loop further comprises a heat exchanger.

9. The fuel cell system of claim 8 wherein the heat exchanger comprises a radiator.

10. The fuel cell system of claim 1 wherein the coolant is selected from the group consisting of deionized water, ethylene glycol and mixtures thereof.

11. The fuel cell system of claim 1 wherein the gas diffusion barrier comprises an expanded graphite sheet material.

12. The fuel cell system of claim 1 wherein the gas diffusion barrier comprises a porous, electrically conductive material having a region filled with a solid, thereby reducing the porosity of the region.

13. The fuel cell system of claim 1 wherein the gas diffusion barrier comprises a laminate having a first layer interposed between a second layer and a fuel cell membrane, the first layer having a lower permeability to water vapor relative to the second layer.

14. The fuel cell system of claim 1 wherein the gas diffusion barrier comprises a microporous membrane.

15. A fuel cell system comprising:
a fuel cell stack comprising a plurality of proton exchange membrane (PEM) fuel cells, each fuel cell having an anode side, a cathode side having an inlet and an outlet, a membrane disposed between the anode and cathode side, and a cathode gas diffusion barrier spaced apart from the membrane and having a lower water vapor permeability than a region adjacent to the membrane, which cathode gas diffusion barrier inhibits the diffusion away from the membrane of water generated in the cathode side as a result of fuel oxidation;
a fuel system for supplying a fuel to the anode side of the fuel cells of the stack;
a humidification device having a dry side having an inlet and an outlet and a wet side having an inlet and an outlet,
an air supply channel including a channel for supplying an air stream to the humidification device dry side inlet and a channel with a blower for supplying air at near ambient pressure from the humidification device dry side outlet to the inlets of the cathode sides of the fuel cells of the stack,
a cathode exhaust conduit connecting the PEM cathode side outlet with the humidification device wet side inlet for transferring water vapor from the cathode exhaust stream in the wet side of the humidification device to the air stream in the dry side of the humidification device;
a coolant loop for circulating a liquid coolant through the stack, and
further comprising a cathode recycle loop for returning at least a portion of the cathode exhaust stream to the fuel cell stack.

16. The fuel cell system of claim 15, further comprising a damper disposed in the cathode recycle loop.

17. The fuel cell system of claim 15, wherein the cathode recycle loop is fluidly connected to the humidification device for supplying a remainder of the cathode exhaust stream thereto.

18. A fuel cell system comprising:
a fuel cell stack comprising a plurality of proton exchange membrane (PEM) fuel cells, each fuel cell having an anode side, a cathode side having an inlet and an outlet, a membrane disposed between the anode and cathode side, and a cathode gas diffusion barrier spaced apart from the membrane and having a lower water vapor permeability than a region adjacent to the membrane, which cathode gas diffusion barrier inhibits the diffusion away from the membrane of water generated in the cathode side as a result of fuel oxidation;
a fuel system for supplying a fuel to the anode side of the fuel cells of the stack;
a box enveloping the stack and having an inlet and an outlet, through which box the air is passed and partially preheated by heat generated in the stack prior to entering the dry side of the humidification device,
a gas exchange humidification device having a dry side having an inlet and an outlet and a wet side having an inlet and an outlet,
an air supply channel including a channel for supplying an air stream to the humidification device dry side inlet and a channel with a blower for supplying air at near ambient pressure from the humidification device dry side outlet to the inlets of the cathode sides of the fuel cells of the stack,
a cathode exhaust conduit connecting the PEM cathode side outlet with the humidification device wet side inlet for transferring water vapor from the cathode exhaust stream in the wet side of the humidification device to the air stream in the dry side of the humidification device across a semi-permeable membrane; and
a coolant loop for circulating a liquid coolant through the stack.

* * * * *